United States Patent
Malik

(10) Patent No.: US 8,014,498 B2
(45) Date of Patent: *Sep. 6, 2011

(54) AUDIO MESSAGE DELIVERY OVER INSTANT MESSAGING

(75) Inventor: Dale W. Malik, Dunwoody, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1373 days.

This patent is subject to a terminal disclaimer.

(21) Appl. No.: 11/538,221

(22) Filed: Oct. 3, 2006

(65) Prior Publication Data

US 2007/0112925 A1    May 17, 2007

Related U.S. Application Data

(63) Continuation of application No. 10/223,903, filed on Aug. 19, 2002, now Pat. No. 7,123,695.

(60) Provisional application No. 60/382,106, filed on May 21, 2002.

(51) Int. Cl.
*H04M 11/06* (2006.01)
*G10L 13/08* (2006.01)

(52) U.S. Cl. .......... 379/88.13; 370/354; 379/88.17; 379/93.09; 455/412.1; 455/414.1; 455/422.1; 455/433; 704/260; 704/270; 704/275; 709/204; 709/219

(58) Field of Classification Search .......... 370/335, 370/389, 354; 379/88.11, 88.13, 88.17, 93.09; 709/202, 206, 204, 219; 455/412.1, 414.1, 455/422.1, 433; 704/260, 270, 275
See application file for complete search history.

(56) References Cited

U.S. PATENT DOCUMENTS

| | | | |
|---|---|---|---|
| 5,278,943 | A | 1/1994 | Gasper et al. |
| 6,389,114 | B1 | 5/2002 | Dowens et al. |
| 6,483,898 | B2 | 11/2002 | Lew et al. |
| 6,553,100 | B1 | 4/2003 | Chen et al. |
| 6,564,261 | B1 | 5/2003 | Gudjonsson et al. |
| 6,629,793 | B1 | 10/2003 | Miller |
| 6,674,725 | B2 | 1/2004 | Nabkel et al. |
| 6,865,384 | B2 | 3/2005 | Sagi et al. |
| 7,058,036 | B1* | 6/2006 | Yu et al. .......... 370/335 |
| 7,123,695 | B2* | 10/2006 | Malik .......... 379/88.13 |
| 7,130,390 | B2* | 10/2006 | Abburi .......... 379/88.17 |
| 7,203,648 | B1* | 4/2007 | Ostermann et al. .......... 704/260 |
| 7,245,611 | B2* | 7/2007 | Narasimhan et al. .......... 370/354 |
| 7,277,855 | B1* | 10/2007 | Acker et al. .......... 704/260 |
| 7,310,334 | B1* | 12/2007 | FitzGerald et al. .......... 370/389 |
| 7,444,392 | B2* | 10/2008 | Rhoads et al. .......... 709/219 |
| 2002/0103850 | A1* | 8/2002 | Moyer et al. .......... 709/202 |
| 2003/0219104 | A1* | 11/2003 | Malik .......... 379/88.11 |
| 2004/0003041 | A1* | 1/2004 | Moore et al. .......... 709/204 |

(Continued)

OTHER PUBLICATIONS

Malik; U.S. Appl. No. 10/223,903, filed Aug. 19, 2002.

(Continued)

*Primary Examiner* — Gerald Gauthier
(74) *Attorney, Agent, or Firm* — Thomas, Kayden, Horstemeyer & Risley, LLP

(57) ABSTRACT

One preferred embodiment of the present invention provides a system and method for sending instant messages having audio recordings. Briefly described, in architecture, one embodiment of the system, among others, includes a communications client of a user that is configured to generate an instant message having an audio recording and send the instant message having an audio recording to another user. Methods and other systems are also provided.

39 Claims, 9 Drawing Sheets

U.S. PATENT DOCUMENTS

2007/0112925 A1* 5/2007 Malik ........................... 709/206

OTHER PUBLICATIONS

Malik; Non-Final Rejection mailed Jun. 4, 2003; U.S. Appl. No. 10/223,903, filed Aug. 19, 2002.

Malik; Final Rejection mailed Dec. 5, 2003; U.S. Appl. No. 10/223,903, filed Aug. 19, 2002.

Malik; Examiner Interview Summary Record mailed Jan. 14, 2004; U.S. Appl. No. 10/223,903, filed Aug. 19, 2002.

Malik; Advisory Action mailed Feb. 25, 2004; U.S. Appl. No. 10/223,903, filed Aug. 19, 2002.

Malik; Final Rejection mailed Jun. 3, 2004; U.S. Appl. No. 10/223,903, filed Aug. 19, 2002.

Malik; Examiner Interview Summary Record mailed Jul. 27, 2004; U.S. Appl. No. 10/223,903, filed Aug. 19, 2002.

Malik; Final Rejection mailed Jan. 12, 2005; U.S. Appl. No. 10/223,903, filed Aug. 19, 2002.

Malik; Non-Final Rejection mailed Apr. 4, 2005; U.S. Appl. No. 10/223,903, filed Aug. 19, 2002.

Malik; Examiner Interview Summary Record mailed May 20, 2005; U.S. Appl. No. 10/223,903, filed Aug. 19, 2002.

Malik; Final Rejection mailed Sep. 22, 2005; U.S. Appl. No. 10/223,903, filed Aug. 19, 2002.

Malik; Non-Final Rejection mailed Feb. 28, 2006; U.S. Appl. No. 10/223,903, filed Aug. 19, 2002.

Malik; Notice of Allowance and Fees Due mailed Aug. 22, 2006; U.S. Appl. No. 10/223,903, filed Aug. 19, 2002.

* cited by examiner

AUDIO MESSAGE DELIVERY OVER INSTANT MESSAGING

CROSS-REFERENCE TO RELATED APPLICATION

This application is a continuation of copending U.S. utility application entitled, "Voice Message Delivery Over Instant Messaging," having Ser. No. 10/223,903, filed Aug. 19, 2002, which is entirely incorporated herein by reference and which claims priority to U.S. provisional application entitled, "Integration of Instant Messaging and Computer Operating Systems," having Ser. No. 60/382,106, filed May 21, 2002, which is entirely incorporated herein by reference.

TECHNICAL FIELD

The present invention is generally related to communications and, more particularly, is related to a system and method for relaying voice messages over a communication network.

BACKGROUND

Presence and availability are terms used to describe a present ability of an individual to communicate. Presence is an ability of an individual to communicate in real time, and availability is the willingness of an individual to communicate in real time. In communications, it is advantageous to know whether a potential recipient of a communication message is present and available, i.e., available to receive and respond to the message before initiating the transmission of the message. By making the presence and availability of individual users known before any communication is attempted, a realtime communications environment is facilitated that is more effective and less obtrusive than conventional communication mediums. Clearly, the communication message that is sent to an addressee that is known to be present and available is more likely to be received promptly than a conventional message. For example, often times, conventional telephone calls are forwarded to a person's voice-mail and are never returned.

Instant messaging (IM) is one communication medium that employs presence and availability technology. An instant messaging network recognizes when a user is present" on the network. Accordingly, the network sends notification to other users (usually members of a "buddy list" or "contact list") that are also logged on the network that the user is "present." Further, instant messaging lets a user display custom status messages to his "buddies" online about the user's "availability." For example, a user can specify his availability status as being "busy, not taking messages." Therefore another user on the "buddy list" that is connected to the instant messaging network will be notified that although the user is present on the network, he is not available for receiving messages. Presence and availability information is most useful when an individual shares his or her online status with a trusted group of users. A communication message sent to someone who is readily present and available is less obtrusive, when the addressee has made himself or herself available to the communication.

An example of a traditional "closed" instant messaging (IM) architecture is shown in FIG. 1. The traditional IM architecture consists of a central IM server 105 connected to a number of individual clients (110, 115, 120, 125, 130, and 145) in a closed network. For example, to send an instant message from client 110 to client 145, IM client 110 first connects with an IM server 105 using a proprietary protocol. For example, AOL® and Yahoo!® use ICQ. Once the IM client 110 is connected to the IM server 105, the user logs on by entering a user name and password. The IM client 110 then sends the IM server 105 the connection information, such as the IP address and the number of the port assigned to the IM client and the name and IP address of everyone in the IM contact list associated with the IM client 110. An IM client may communicate directly with other IM clients if the IP addresses of these IM clients are known to the transmitting IM client. For convenience, the lines of communication between individual IM clients are not shown in FIG. 1.

The IM server 105 then creates a temporary file that contains the connection information for the IM client 110 and for each IM client 115, 120, 125, 130, 145. Once the temporary files have been created, the IM server 105 checks the network to determine whether any IM client identified by the contact list associated with IM client 110 is currently logged into the system. If the IM server 105 finds any of the contacts logged onto the network, the IM server 105 sends a message back to the IM client 110 with the connection information for each IM client 115, 120, 125, 130, 145 currently logged onto the network. When the IM client 110 receives the connection information, the presence status of that particular IM client 115, 120, 125, 130, 145 is updated to "Online," for example. The presence status is displayed to the user. At this point the user may select any IM client 115, 120, 125, 130, 145 that is registered "Online," at which point a dialog box will appear in which the user may enter text. Because the IM client 110 knows the IP address and port number of the IM client 145, the message is sent directly to the recipient IM client 145. The IM client 145 then receives the instant message and can respond. Once the IM session is complete the dialog box is closed, and the IM client 110 goes offline and sends a message to the IM server 105 terminating the session. The IM server 105, in response to acknowledging that the IM client 110 has logged off, generates a message to each of the IM clients 115, 120, 145 on the client list of IM client 110 indicating that IM client 110 is logged off the network.

Jabber is an example of an "open" instant messaging architecture. Jabber, available from Jabber, Inc. of Denver, Colo., includes an IM system focusing on providing IM access to a user. Jabber includes an Extensible Markup Language (XML) open source server software that was developed by a community of developers over the Internet. Jabber allows communication among applications and systems across platforms. Developers write additional modules to submit them back for possible incorporation into the Jabber software.

A block diagram illustrating a prior art IM network that uses Jabber interoperable XML-based network architecture is shown in FIG. 2. Jabber is a real-time communications platform based on open protocols whose architecture is based on the well-known electronic mail system. Because Jabber is based on the email system, the Jabber architecture contains distributed network servers, called Jabber servers 215-217 and clients, known as Jabber clients 200-205 that receive and send messages to Jabber clients 200-205 connected to other Jabber server 215-217 on the Internet. However, unlike typical email systems, which are store and forward systems, Jabber delivers messages in real time because the Jabber server 215-217 knows when a particular Jabber client 200-205 is online and available. The Jabber architecture is based on client-server architecture and not on a client-to-client architecture, as are most IM systems. Messages from Jabber client 200 to Jabber client 201 must pass through the Jabber server 215. Each Jabber client 200-205 is attached to a local Jabber server 215-217. Each local Jabber server 215-217 receives information from one Jabber client 200-205 and transfers the information to another Jabber client 200-205 along with presence and availability information. Each local Jabber server 215-217 functions independently from one another, and can communicate with any other Jabber server 215-217 that is connected to the Internet as long as it has been identified, and predisposed to do so ahead of time. Each local Jabber server 215-217 performs two functions: listening for and communicating directly with Jabber client applications 200-205, and communicating with other Jabber servers 215-217. Each local Jabber server 215-217 consists of multiple components that separately handle individual functions with the Jabber system.

In many instant messaging communications, if a user is not present to receive an instant message, the instant message can still be sent and queued in the IM server 105 or Jabber server 215-217 that is servicing the IM client of the user. The IM server will hold the message until the user is present again on the instant messaging network. In this manner, the instant message is delivered to the user as soon as the user is present on the instant messaging network.

Today's instant messaging services mostly focus on the storing of text instant messages in a queue for later delivery to the user once the user becomes present on the network. However, today's service typically does not allow for non-text instant messages to be stored in a queue for later immediate delivery. Thus, a heretofore unaddressed need exists in the industry to address the aforementioned deficiencies and inadequacies.

SUMMARY

Preferred embodiments of the present invention provide systems and methods for sending voice instant messages. Briefly described, in architecture, one embodiment of the system, among others, can be implemented as follows. A communications client of a user is configured to: generate an instant message having an audio recording and send the instant message having an audio recording to another user.

The present invention can also be viewed as providing methods for sending voice instant messages. In this regard, one embodiment of such a method, among others, can be broadly summarized by the following steps: generating an instant message having an audio recording; and sending the instant message having the audio recording.

Other systems, methods, features, and advantages of the present invention will be or become apparent to one with skill in the art upon examination of the following drawings and detailed description. It is intended that all such additional systems, methods, features, and advantages be included within this description and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 3:
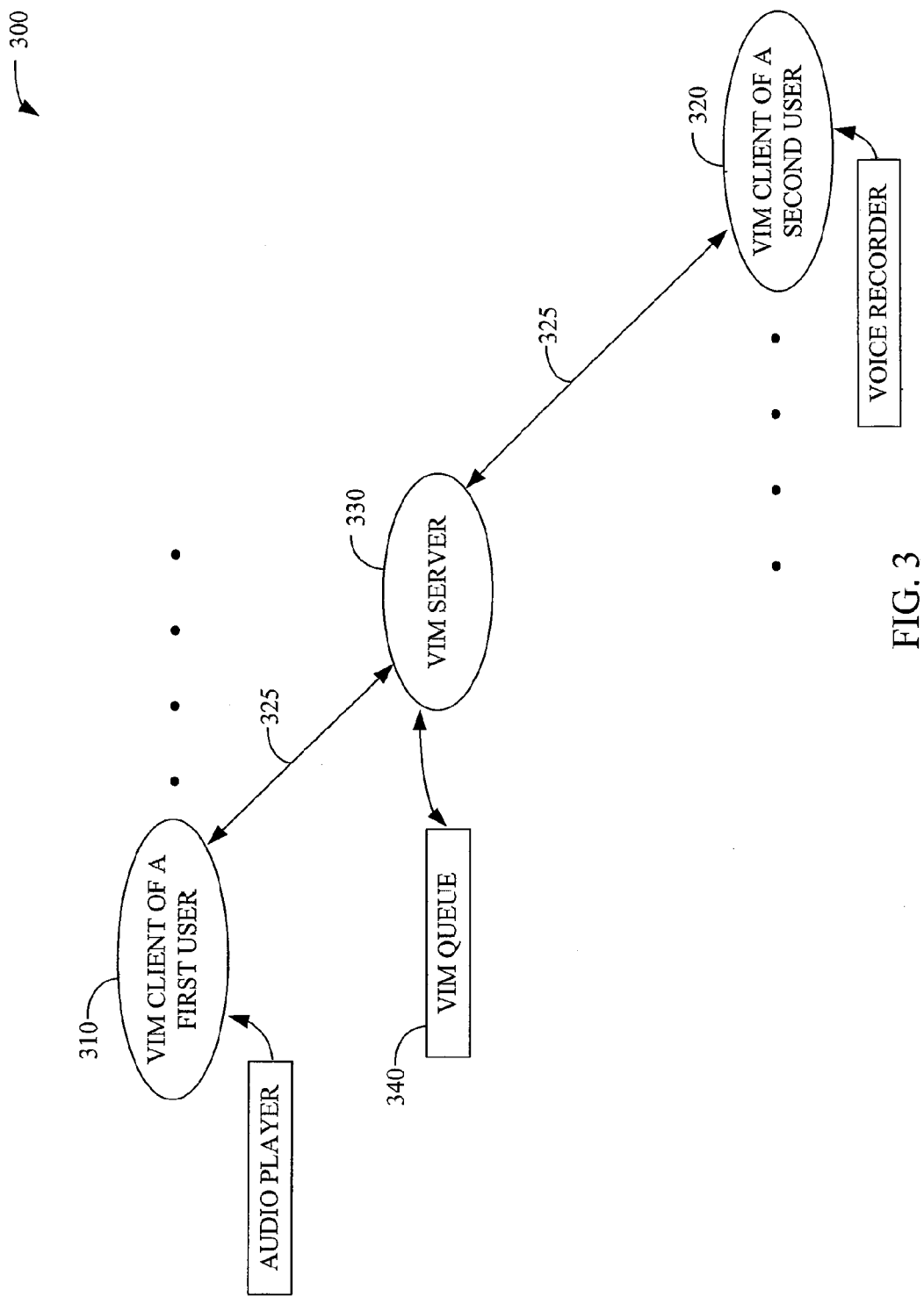
FIG. 3 is a block diagram of a voice message delivery system of one preferred embodiment of the present invention.

Depicted in FIG. 3 is a block diagram of one representative embodiment, among others, of a voice message delivery system 300. The voice message delivery system 300 includes a voice instant messaging (VIM) client 310 of a first user, wherein the VIM client 310 is configured to receive and play a voice recording in a voice instant message it receives from other users, such as a second user. Accordingly, a VIM client 320 of the second user is configured to generate a voice recording of the second user and include the voice recording in an instant message upon accepting a VIM invitation. A VIM invitation is a message that is transmitted by the VIM client 310 of the first user to the VIM client 320 of the second user, wherein the message invites or prompts the VIM client 320 of the second user to generate a voice recording for the first user.

Figure 1:
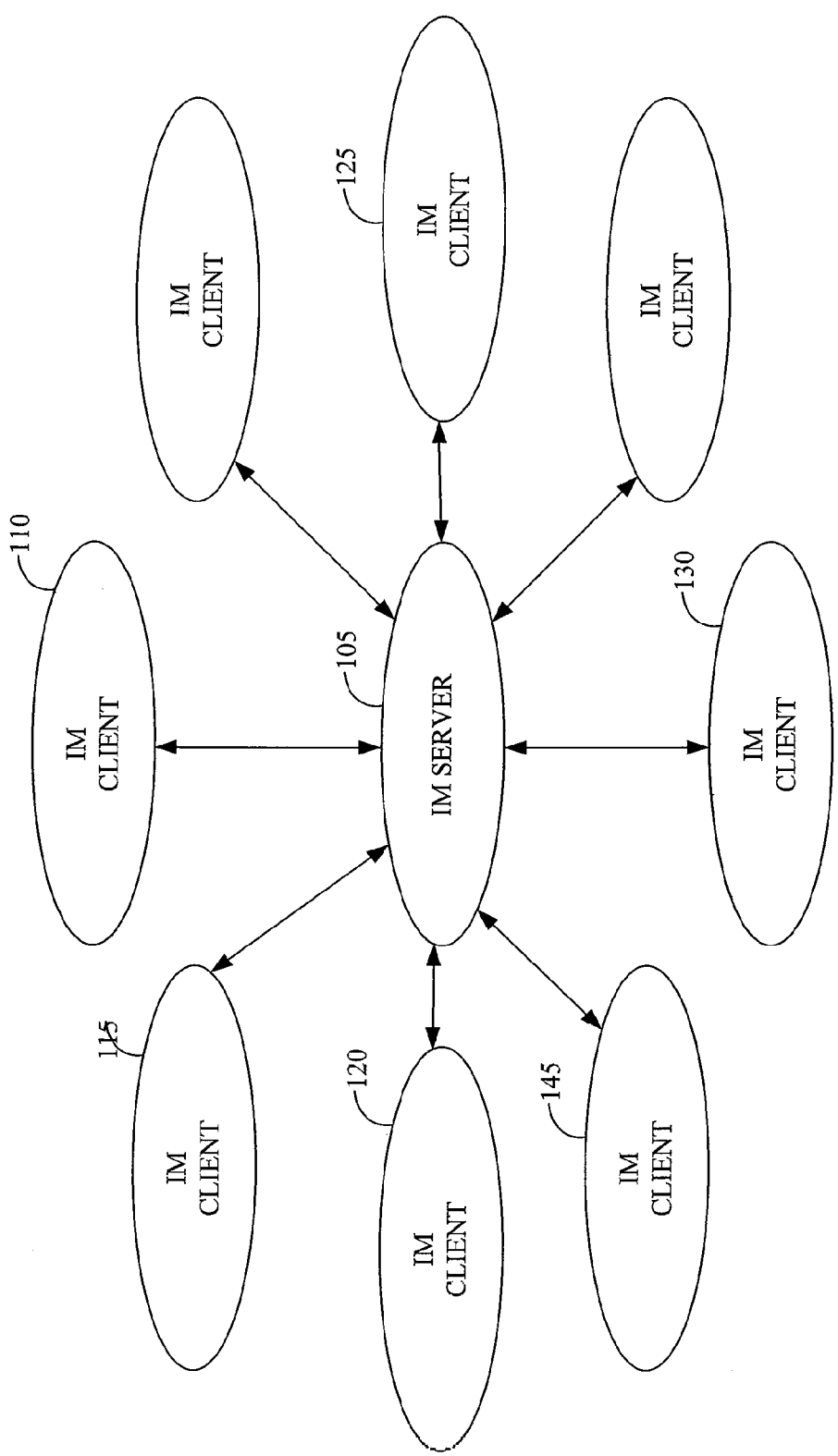
FIG. 1 is a block diagram of a closed instant messaging architecture of the prior art.
Figure 2:
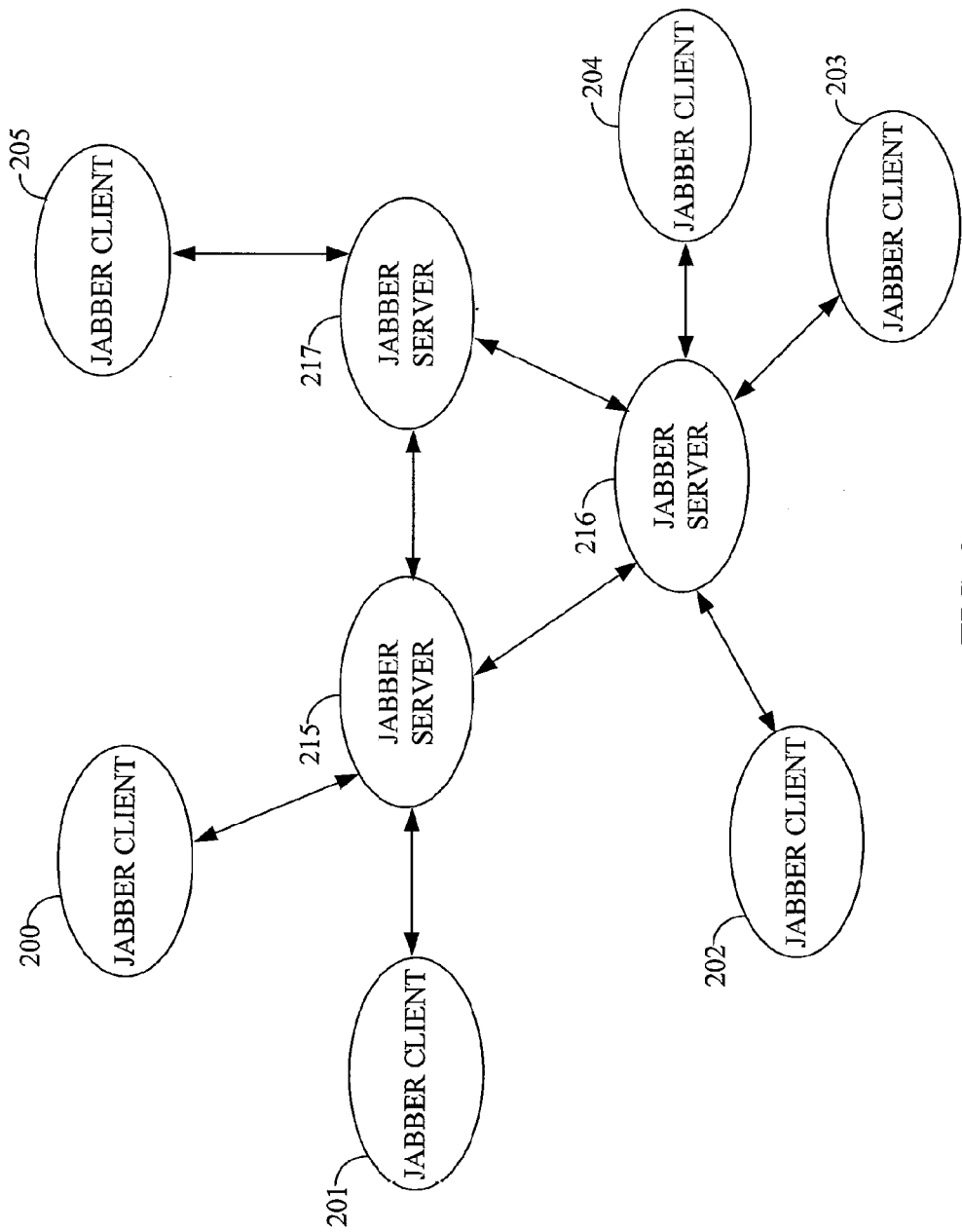
FIG. 2 is a block diagram of an open instant messaging architecture of the prior art.

Each VIM client 310, 320 communicates with and receives presence status information from a VIM server 330 via the Internet or some other communication network 325. The VIM server 330 may act as a single IM server 105 of FIG. 1 or a local IM server, such as a Jabber Server 215 of FIG. 2. The VIM server 330 monitors the presence information of the VIM clients, such as the VIM client of the first user 310, and notifies a VIM client 310 of the presence status information of other VIM clients 320 and their associated users. Accordingly, the VIM server 330 includes the capabilities of conventional IM servers and the additional capabilities for handling VIM message delivery and storage.

For example, in one preferred embodiment of the invention, the first user designates contact parameters. The contact parameters are criteria on (a) whom a user wants to receive presence information about and (b) how a user wants to receive the presence information. Within the contact parameters, the first user may name the second user as a person about whom the first user wants to receive presence information about. Other information may also be contained in the contact parameters such as the instant messaging addresses of the people named in the contact list. The contact parameters are then stored in a centralized storage medium 340 that is accessible by the VIM client 310 of the first user or the VIM server 330 depending upon the architecture of the instant messaging network.

In a closed system (FIG. 1), the contact parameters are typically stored in a storage medium (not shown) that is accessible by the VIM client 310, 320, such as an internal disk drive of a general purpose computer or the memory of a mobile device. Then, a copy of the contact parameters are given to the VIM server 330. In an open system (FIG. 2), however, the contact parameters are stored in a storage medium (not shown) accessible by the VIM server 330, such as an internal disk drive or a separate storage medium, such as a database. The VIM server 330 then forwards a copy of the contact parameters to the VIM client 310. Typically, the VIM client 310 knows from the contact parameters the names of the people that the first user wants to receive presence status information about. Accordingly, the voice message delivery system can be incorporated over many instant messaging configurations, such as peer-to-peer, with the VIM server 330 providing primarily passive directory services, and clients-to-clients, with a single VIM server 330 providing directory services as well as message queuing and delivery.

In one preferred embodiment of the invention, whenever a user is not present and available to receive an instant message, a voice instant message may be stored in a queue 340 of the VIM server 330 for the user. Accordingly, the voice instant message is delivered to the user the next time that the user connects to the instant messaging network via his or her IM client. In an alternative preferred embodiment of the present invention, a user ("first user") may designate or authorize the people named on his or her contact parameters from whom the user will accept voice instant messages. Accordingly, a VIM client of an authorized user ("second user") can check to see if the second user is authorized by the first user to generate a voice instant message for the first user. These designations are specified in a set of voice contact parameters that may be a subset of the contact parameters, or the voice contact parameters may be stored separately from the contact parameters. Preferably, the voice contact parameters of a first user are readily accessible by the VIM clients of other users, such as the second user, so that the VIM clients of other users can verify if the first user has authorized the other users to send a voice instant message to the first user.

Figure 4:
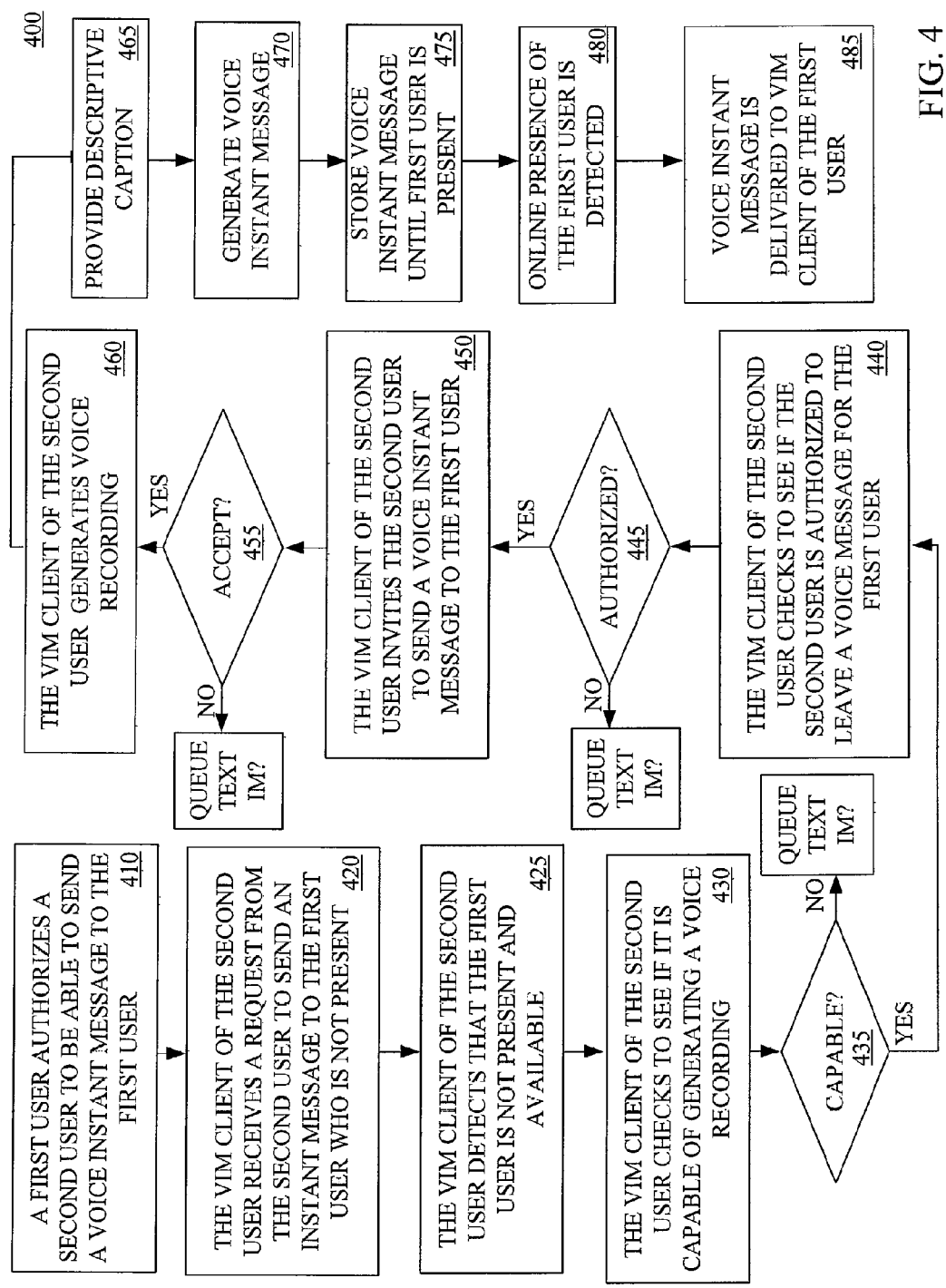
FIG. 4 is a flowchart describing the functionality of a representative implementation of the voice message delivery system of FIG. 3.

The flowchart of FIG. 4 shows the functionality of a representative implementation of the voice message delivery system 300 of the present invention. It should also be noted that in some alternative implementations the functions noted in the various blocks may occur out of the order depicted in the flowchart of FIG. 4. For example, two blocks shown in succession in FIG. 4 may, in fact, be executed substantially concurrently. Alternatively, the blocks may sometimes be executed in the reverse order depending upon the functionality involved. In other embodiments, some blocks shown in FIG. 4 are omitted.

As depicted in FIG. 4, the functionality of a representative embodiment of the voice message delivery system 300 or method 400 may be construed as beginning at block 410. In block 410, a first user designates in voice contact parameters that the first user will accept voice messages from a second user. For example, a first user may specify in his or her contact list the persons that the first user would like to provide voice instant messaging capability to, via checking a box by that person's name in the person's contact list, for example. The contact parameters are stored in a centralized storage medium 340 that is accessible by the VIM client 310 of the first user or the VIM server 330 depending upon the architecture of the instant messaging network. Therefore, at a later time, when an authorized user attempts to send an instant message to the first user and the first user is not present and/or available, the authorized user may be given the opportunity to generate a voice instant message for the first user. In alternative embodiments, the authorized user may generate a voice instant message regardless of the presence and/or availability state of the first user.

In block 420, the VIM client 320 of the second user receives a request or prompt by the second user to send an instant message to the first user. Typically, the request is generated after the second user attempts to initiate the transmission of the instant message. The VIM client 320 of the second user, however, detects that the first user is not present and/or available and, therefore, does not initiate the sending of the instant message, as shown in block 425. Accordingly, in blocks 430-435, the VIM client 320 of the second user checks to see if the computing device of the VIM client 320 is capable of generating a voice recording. Typically, the voice recording capabilities of the computing device are specified in settings of the VIM client by the second user. In blocks 440-445, the VIM client of the second user also checks the voice contact parameters of the first user to see if the second user is authorized by the first user to leave a voice instant message for the first user. If the second user is not authorized to leave a voice instant message or if the VIM client 320 of the second user cannot generate a voice recording, the second user is then given the option of sending a textual instant message and having the message placed in a queue of the VIM server 330. Alternatively, the second user may not be able to store the instant message in a queue.

If the second user is authorized to leave a voice instant message and the VIM client 320 of the second user has the capability to leave a voice instant message, then the VIM client 320 of the second user invites or prompts the second user to leave a voice message, as depicted in block 450. If the second user declines the VIM invitation, then the second user again is given the option of sending a textual instant message and having the message placed in the queue of the VIM server 330, as shown in block 455. However, in block 460, if the second user accepts the VIM invitation, then the VIM client 320 of the second user starts a voice recorder. Accordingly, the second user speaks into a microphone that is coupled to the computing device of the VIM client 320 of the second user, and the VIM client 320 of the second user generates a voice recording for the first user.

In block 465, after the voice recording has been generated, the VIM client 320 of the second user prompts the second user to type a descriptive caption for the voice recording. Then in block 470, a voice instant message is generated by including the descriptive caption and the voice recording in an instant message. The descriptive caption may be marked by XML tags so that it can subsequently be identified by the VIM client 310 of the first user. If a descriptive caption is not provided by the second user, the voice instant message may be sent without the caption.

The voice instant message is sent to the VIM server 330 and stored in a VIM queue 340 of the VIM server 350, as depicted in block 475. Next, in block 480, the VIM server 350 detects when the first user is present and/or available to receive instant messages again by monitoring the presence status of the first user. Then, the VIM server 330 delivers the voice instant message from the VIM queue 340 to the VIM client 310 of the first user, as depicted in block 485.

Figure 5:
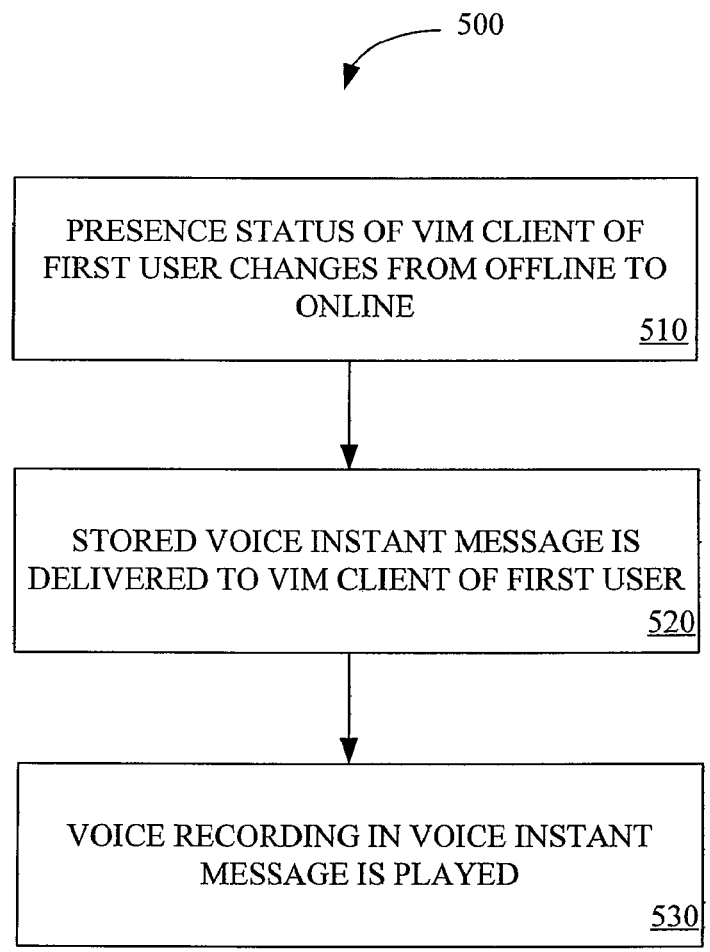
FIG. 5 is a flowchart describing the functionality of a representative implementation of the voice message delivery system of FIG. 3.

FIG. 5 is a flowchart depicting a method 500 for receiving and playing a voice instant message at the VIM client 310 of the first user for one preferred embodiment of the invention. In block 510, the VIM client 310 of the first user changes from an offline presence status to an online presence status. In block 520, the voice instant messages stored in the VIM queue 340 for the first user are delivered to the VIM client 310 of the first user. Each voice instant message contains a descriptive caption and a voice recording that was provided by the originator of the voice instant message. As depicted in block 530, the first user via the VIM client 310 plays the voice recording by activating the recording using a mouse click or a keystroke from a keyboard or keypad, for example. Alternatively, the voice instant message may not be delivered to the first user, until the first user specifically requests for the voice instant message to be sent from the queue.

In some embodiments of the present invention, the voice instant message is distinctively marked with XML tags so that a VIM client 310 that receives a voice instant message will recognize the instant message as a voice instant message. Additionally, the descriptive caption may be marked so that the VIM client may display the caption without opening the voice instant message. After a VIM client 310 recognizes a marked voice instant message, the VIM client 310 may prompt the recipient of the voice instant message to send a voice instant message in reply. The reply voice instant message would then be delivered immediately to the addressee if the addressee is presently online. Else, the voice instant message would be stored in a VIM queue 340.

Additionally, in some embodiments of the invention where the voice instant message is not automatically delivered to the first user, the VIM server 340 sends the VIM client 310 of the first user a list of the voice instant messages contained in the VIM queue 340 for the first user so that the first user can selectively choose which voice instant messages that the first user listens to. The list contains the identity of the originator of each voice instant message and the descriptive caption for each voice instant message.

Alternatively, for each voice instant message placed in the VIM queue for the first user, the VIM server 340 may send an update message to the VIM client 310 of the first user. The update message may contain an identifier or tracking number for the VIM message it pertains to, the identity of the originator of the voice instant message, and the descriptive caption from the voice instant message. Accordingly, the VIM client 310 of the first user may track and update the number of voice instant messages that are currently awaiting to be received by the first user. Additionally, the VIM client 310 can track the identities of the originators of these messages. For example, the VIM client 310 may display the contact list of the first user, and next to each user's name on the contact list, the number of unreceived voice messages that users have left the first user may be shown. Also, additional information, such as the date and time, may be shown.

The VIM client 310, 320 or the VIM server 330 of a representative embodiment of the present invention can be implemented in software, firmware, hardware, or a combination thereof. Preferably, the VIM client 310, 320 or VIM server 330 are implemented in software, as an executable program, and are executed by special or general purpose digital computers, such as a personal computer, workstation, minicomputer, or mainframe computer. An example of a general purpose computer that can implement the VIM client 310, 320 or VIM server 330 (although not shown) of one preferred embodiment of the present invention is shown in FIG. 6.

Figure 6:
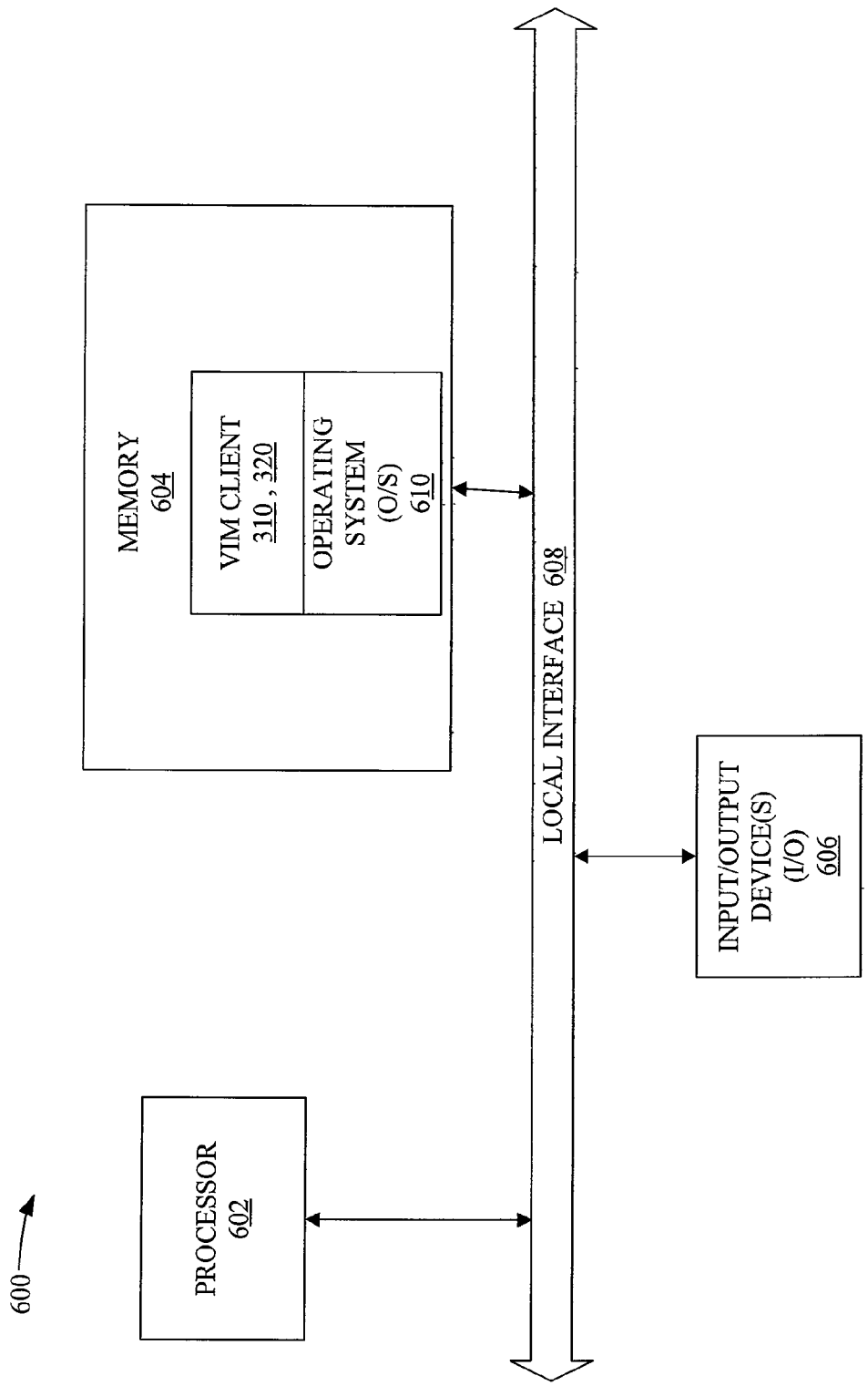
FIG. 6 is a block diagram of an implementation of the VIM client in FIG. 3 using a general computer system.

Generally, in terms of hardware architecture, as shown in FIG. 6, the computer 600 includes a processor 602, memory 604, and one or more input and/or output (I/O) devices 606 (or peripherals) that are communicatively coupled via a local interface 608. The local interface 608 can be, for example but not limited to, one or more buses or other wired or wireless connections, as is known in the art. The local interface 608 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 602 may be a hardware device for executing software that can be stored in memory 604. The processor 602 can be any custom made or commercially available processor, a central processing unit (CPU) or an auxiliary processor among several processors associated with the computer 400, and a semiconductor based microprocessor (in the form of a microchip) or a macroprocessor.

The memory 604 can include any one or combination of volatile memory elements (e.g., random access memory (RAM, such as DRAM, SRAM, etc.)) and nonvolatile memory elements (e.g., ROM, hard drive, tape, CDROM, etc.). Moreover, the memory 604 may incorporate electronic, magnetic, optical, and/or other types of storage media. Note that the memory 604 can have a distributed architecture, where various components are situated remote from one another, but can be accessed by the processor 602.

The software in memory 604 may include one or more separate programs, each of which comprises an ordered listing of executable instructions for implementing logical functions. In the example of FIG. 6, the software in the memory 604 includes the VIM client 310, 320 and an operating system (O/S) 610. Correspondingly, the software could also include the VIM server 330 (not shown). The operating system 610 essentially controls the execution of other computer programs, and provides scheduling, input-output control, file and data management, memory management, and communication control and related services.

The VIM client 310, 320 or VIM server 330 may be a source program, executable program (object code), script, or any other entity comprising a set of instructions to be performed. If the VIM client 310, 320 or VIM server 330 is a source program, then the program needs to be translated via a compiler, assembler, interpreter, or the like, which may or may not be included within the memory 604, so as to operate properly in connection with the O/S 610. Furthermore, the VIM client 310, 320 or VIM server 330 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices 606 may include input devices, for example but not limited to, a keyboard, mouse, scanner, digital camera, multi-function device, digital sender, microphone, etc. Furthermore, the I/O devices 606 may also include output devices, for example but not limited to, a printer, display, etc. Finally, the I/O devices 606 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 600 is a PC, workstation, or the like, the software in the memory 604 may further include a basic input output system (BIOS) (omitted for simplicity). The BIOS is a set of essential software routines that initialize and test hardware at startup, start the O/S 610, and support the transfer of data among the hardware devices. The BIOS is stored in ROM so that the BIOS can be executed when the computer 600 is activated.

When the computer 600 is in operation, the processor 602 is configured to execute software stored within the memory 604, to communicate data to and from the memory 604, and to generally control operations of the computer 600 pursuant to the software. The VIM client 310, 320 (or IM server 330) and the O/S 610, in whole or in part, but typically the latter, are read by the processor 602, perhaps buffered within the processor 602, and then executed.

When the VIM client 310, 320 (or VIM server 330) is implemented in software, as is shown in FIGS. 4-5, it should be noted that the VIM client 310, 320 (or VIM server 330) can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The VIM client 310, 320 and VIM server 330 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the VIM client 310, 320 or VIM server 330 is implemented in hardware, the VIM client 310, 320 or VIM server 330 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 7:
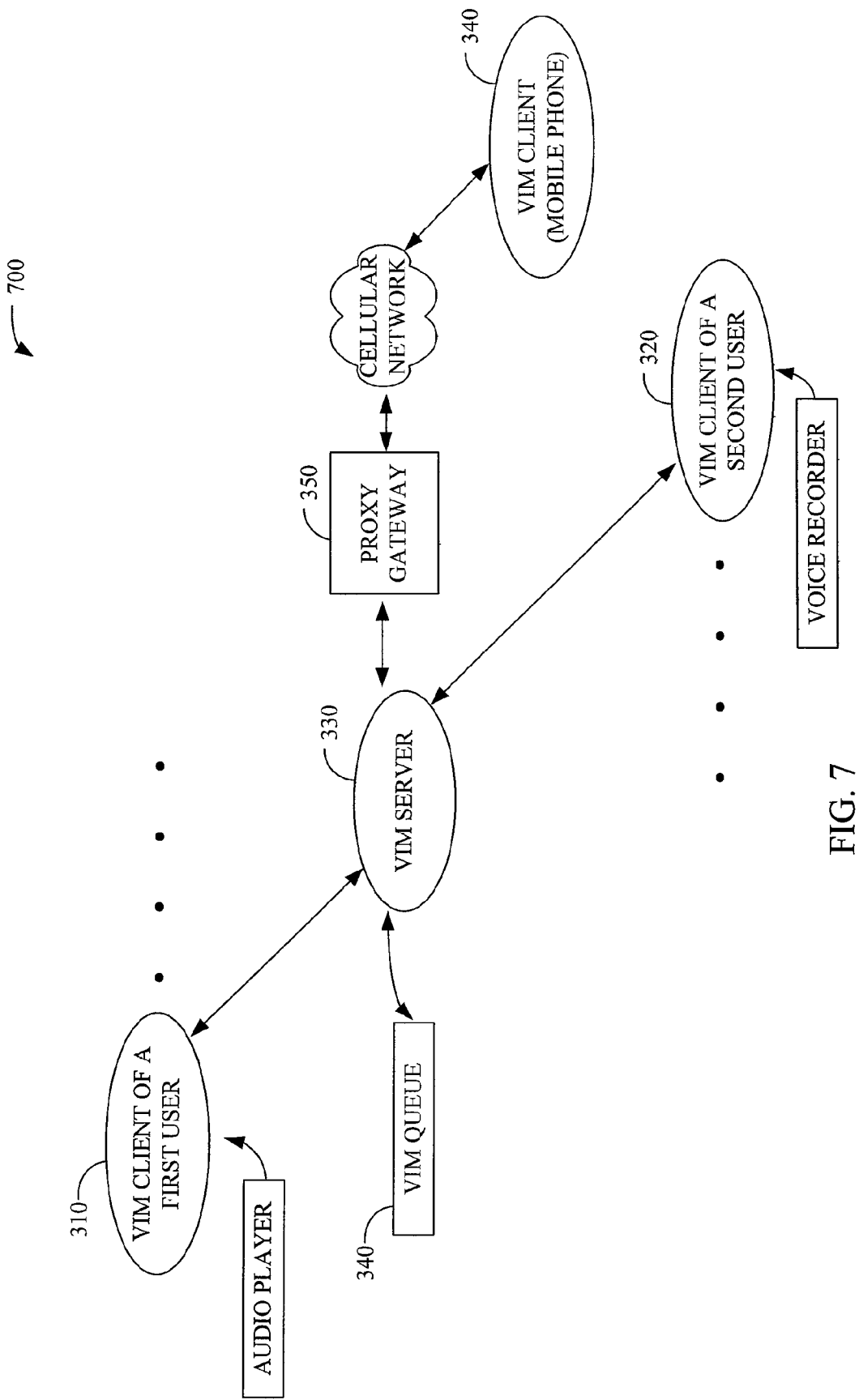
FIG. 7 is a block diagram of a voice message delivery system of one preferred embodiment of the present invention.

In addition to a general computer, the VIM client 310, 320 may also include mobile devices, such as, among others, a personal digital assistant, a cellular phone, or a pager. In one preferred embodiment of the present invention, as shown in FIG. 7, a user can specify a particular VIM client 340 to be the recipient of voice instant messaging. For example, a first user may have more than one VIM client 310, 340 that is capable of receiving a voice instant message. Accordingly, the first user may designate his or her mobile cellular phone as the VIM client 340 that should receive all voice instant messages. Therefore, the VIM server 330 would then deliver a voice instant message to the mobile cellular phone 340 of the first user via a proxy gateway 350.

The proxy gateway 350 acts as a proxy for the first user to the VIM service. When the proxy gateway 350 receives a voice instant message for the first user, the proxy gateway 350 dials the mobile cellular phone 340 of the first party and delivers the voice recording in the voice instant message to the first user via the mobile cellular phone 340. Additionally, the proxy gateway 350 converts the short descriptive caption in the voice instant message from text to voice and delivers the descriptive caption to the first user as an audio transmission over the mobile cellular phone 340. Alternatively, the proxy gateway may 350 send the textual descriptive caption to the mobile phone 340 using wireless application protocol (WAP) or short messaging service (SMS) protocols, if the mobile phone 340 has the capability to display textual data.

In another embodiment of the present invention, routing rules may be designated by a user to deliver voice instant messages to a mobile device of a user whenever the user is not present on a particular VIM client 310 of the user. For example, a first user may designate a rule that voice instant messages should be delivered to his or her mobile cellular phone 340 whenever the first user is not presently online on his or her personal computer 310. Accordingly, the VIM server 330 would deliver the voice instant messages to the mobile phone 340 via a gateway 350 the next time that the first user turned on his or her mobile phone 340 and was not online on his or her personal computer 310, for example.

Figure 8:
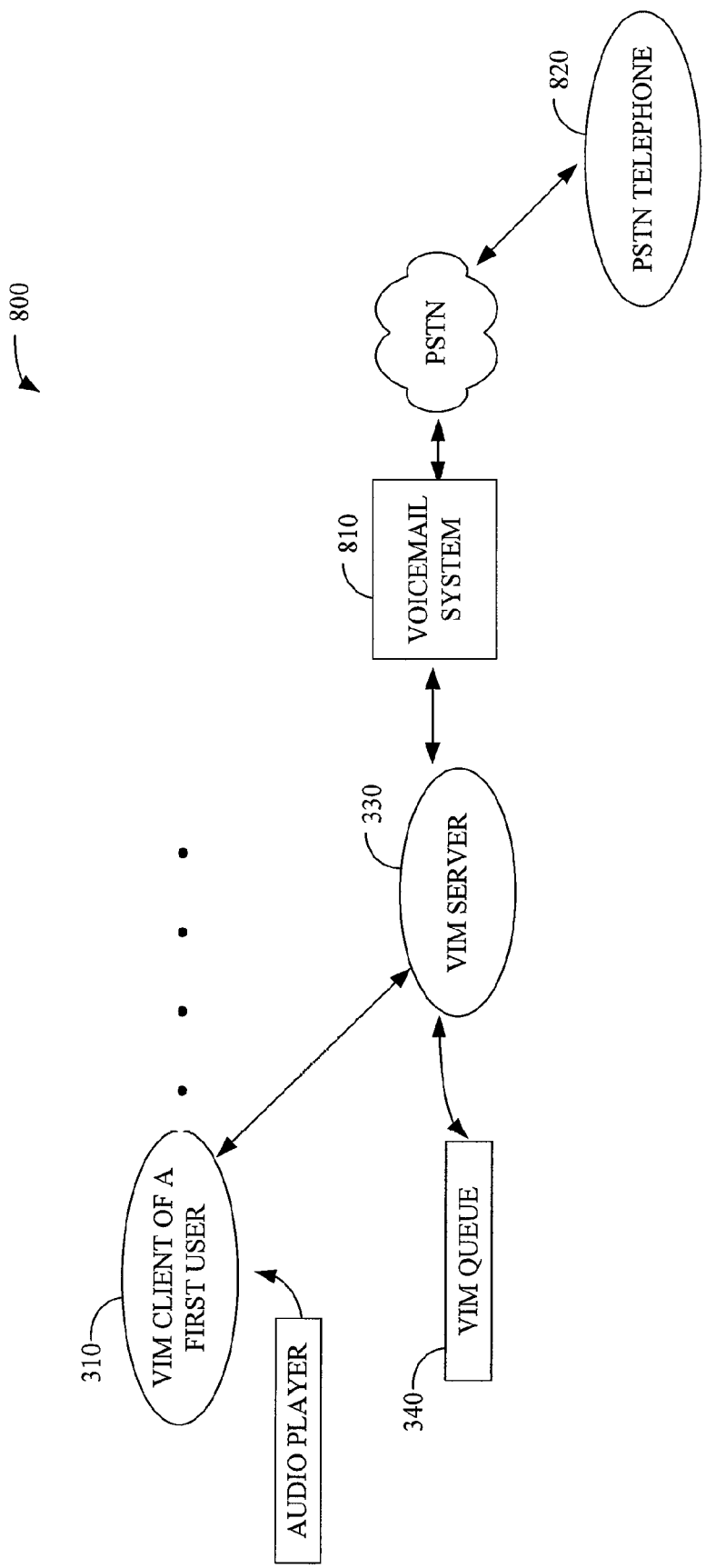
FIG. 8 is a block diagram of a voice message delivery system of one preferred embodiment of the present invention.

Conversely, in some embodiments, voicemail recordings for a PSTN network may be routed and delivered to a VIM client 310. In one preferred embodiment of the present invention, as shown in FIG. 8, the voice message delivery system 800 includes a VIM client 310 and a voicemail system 810 that is accessible by a PSTN telephone 820 and the VIM server 330. The voicemail system 810 records and stores voicemail recordings for subscribers of the voicemail system 810. Subscribers may access their voicemail recordings on the voicemail system 810 via a PSTN telephone 820 or a VIM client 310. For example, a second user may leave a voicemail recording via a telephone 820 on the voicemail system 810 for the first user. Further, the first user may set parameters within the voicemail system 810 for his or her voicemail recordings to be forwarded to his or her VIM client 310. The functionality of this particular embodiment 800 is depicted in the flowchart of FIG. 9.

Figure 9:
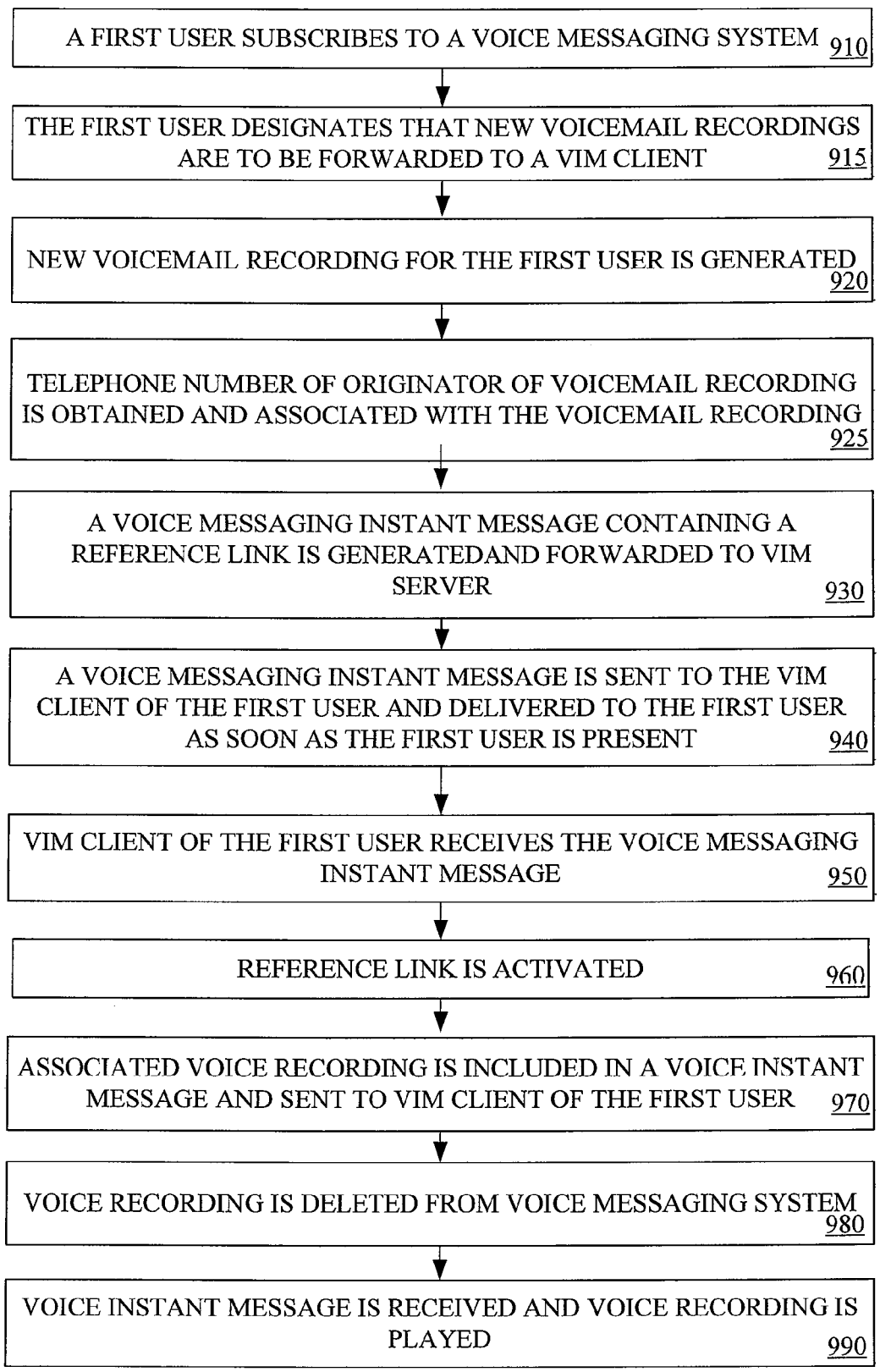
FIG. 9 is a flowchart describing the functionality of a representative implementation of the voice message delivery system of FIG. 8.

In block 910 of FIG. 9, the first user subscribes to a voicemail messaging system 810 and provides the system his or her instant messaging address. In block 915, the first user designates in a user profile, for example, that new voicemail recordings should be forwarded to the VIM client 310 of the first user. Then, in block 920, a new voicemail recording for the first user is generated on the voicemail system 810. The directory telephone number of the party that left the new voice recording is obtained and associated with the new voicemail recording in the voicemail system 810, as depicted in block 925. For example, the directory telephone number may be obtained using caller-ID technology, or the party leaving the recording may be prompted to type or punch in his or her telephone number using the keypad of his or her telephone, etc. In block 930, a voice messaging instant message is generated by the voice mail system 810 and forwarded to the VIM server 330. The voice messaging instant message contains the directory telephone number of the originator of the voicemail recording and a reference link to the new voicemail recording on the voicemail system 810. Also, the voice messaging instant recording may be marked with distinct tags or markers so that a VIM client 310 can recognize it as a special type of instant message.

In block 940, the voice messaging instant message is sent to the first user and delivered to the VIM client 310 as soon as the first user is present. If the first user is not present, the voice messaging instant message is stored in the VIM queue 340. In block 950, the VIM client 310 of the first user receives the voice messaging instant message. If the voice messaging instant message is appropriately marked, the VIM client 310 of the first user may recognize that the voice messaging instant message was sent by the voicemail system 810. Accordingly, the VIM client 310 of the first user may handle the message differently than a typical instant message. For example, the VIM client 310 may associate the directory telephone number contained in the message with a user in the copy of the contact list maintained by the VIM client 310. Accordingly for this embodiment, the directory numbers of such users are also provided in the contact list. Therefore, the VIM client 310 may visually display how many voicemail recordings a particular user in the contact list has left in the voicemail system for the first user. The time and date that the message was received may also be provided to the first user. These visual displays may be provided in a visual representation of the first user's contact list (i.e. buddy list) where next to a user's name an icon may represent that a user has left a voicemail recording. The number of recordings left by the user may also be visually provided, for example.

In block 960, the reference link within the voice messaging instant message is activated by the recipient. For example, in the buddy list representation above, by activating, via a mouse click or a keystroke, an icon next to a user's name, the first user may be presented the ability to access the reference links in the brief instant messages that are associated with the user from the buddy list. Accordingly, the first user may be able to activate (via a mouse click or a keystroke, for example) an individual reference link from an individual voice messaging instant message. In block 970, after the reference link is activated, the voicemail recording in the voicemail system 810 that is associated with that reference link is included in a voice instant message and sent to the VIM client of the first user. In block 980, after the voice recording is sent, the voice recording is deleted from the voicemail system 810. In block 990, the VIM client 310 of the first user receives the voice instant message and initiates the playing of the voicemail recording contained in the voice instant message. Alternatively to this embodiment, a voice recording from a voicemail system may automatically be sent in a voice instant message from the voicemail system to the VIM client of the first user without the first user requesting the voice message be sent. Also, the voice recording may be downloaded by the VIM client from the voice messaging system without being included in a voice instant message.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. For example, the VIM invitation that is presented to a user may be an outgoing audio message stored at a VIM server and retrieved by a VIM client. Further, in some embodiments of the voice message delivery system, a different outgoing message may be presented to a user depending upon a particular presence or availability state. For instance, a first user may designate that a particular outgoing message, such as "Hold on, I'll be available soon," should be played on the VIM client of a second user when the first user is "Present, but not available to chat." Additionally in some embodiments, a network administrator may place a class of service marker in a profile of a user that is used in conjunction with presence information to provide voice instant messaging capability for the user. All such modifications and variations are intended to be included herein within the scope of this disclosure and the present invention and protected by the following claims.

Therefore, having thus described the invention, at least the following is claimed:

1. A method for delivering an instant message to a user from a party who has logged into an instant messaging network, comprising:
   in response to a request to initiate an instant message session with the user, checking for authorization from the user for sending an instant message having an audio recording from the party to the user before prompting the party with a request for generating the instant message having the audio recording from the party, wherein authorization is maintained in profile information for the user;
   in response to declination of the request from the party, generating a textual instant message from the party and sending the textual instant message to the user via the instant messaging network;
   in response to acceptance of the request from the party, generating the instant message having an audio recording from the party if authorization is received and
   sending the instant message having the audio recording from the party to the user via the instant messaging network.

2. The method of claim 1, wherein the instant message having an audio recording includes a descriptive caption provided by the party, the method further comprising:
   generating the descriptive caption.

3. The method of claim 1, further comprising:
   receiving a request from the party to send an instant message to the user; and
   detecting that the user is not present to receive the instant message before attempting to initiate the sending of the instant message having an audio recording and before performing the checking for authorization step.

4. The method of claim 3, further comprising:
   storing the instant message having an audio recording until the user is present on the instant messaging network; and
   delivering the instant message having an audio recording to a recipient once the recipient is present to receive the instant message having an audio recording.

5. The method of claim 4, further comprising:
   generating a list of all the stored instant messages having audio recordings for the user; and
   presenting the list to the user.

6. The method of claim 5, wherein the list displays a respective originator of a respective stored instant message having an audio recording.

7. The method of claim 6, wherein the list displays a respective descriptive caption of the respective stored instant message having an audio recording.

8. The method of claim 4, further comprising:
   displaying a visual symbol next to a name of a person in a contact list to show that the person sent the instant message having an audio recording.

9. The method of claim 1, wherein a user authorizes the sending of an instant message having an audio recording to the user for a particular presence state of the user, the particular presence state corresponding to the user being logged off the instant messaging network.

10. The method of claim 1, further comprising:
    verifying a capability to generate the audio recording.

11. The method of claim 10, further comprising:
    presenting an instant messaging invitation to the party offering to generate the audio recording.

12. The method of claim 11, wherein the instant messaging invitation is an outgoing prerecorded message from the user.

13. The method of claim 12, wherein a particular instant messaging invitation associated with the user is presented to the party according to a particular presence state of the user, the particular presence state corresponding to the user being logged off the instant messaging network.

14. The method of claim 1, further comprising:
receiving the instant message having an audio recording; and
playing the audio recording contained in the instant message having the audio recording.

15. The method of claim 1, wherein the audio recording is generated on a voicemail system.

16. The method of claim 15, further comprising:
obtaining the directory number of an originator of the audio recording; and
providing the user the directory number associated with the audio recording.

17. The method of claim 16, further comprising:
displaying a visual symbol next to a name of a person in the contact list to shown that the person is an originator of the audio recording, wherein the directory number associated with the audio recording is compared to directory numbers of persons on the contact list.

18. The method of claim 13, further comprising:
generating a list of all the stored instant messages having audio recordings for the user; and
presenting the list to the user.

19. A system for delivering an instant message from a second user to a first user, comprising:
a second communications client of a second user configured to:
in response to a request to initiate an instant message session with the first user, check for authorization from the first user for sending an instant message having an audio recording from the second user to the first user;
in response to declination of the request from the second user, generate a textual instant message from the second user and send the textual instant message to the first user;
in response to acceptance of the request from the second user, generate an instant message having an audio recording from the second user, wherein the second communications client is further configured to generate the audio recording; and
send the instant message having an audio recording to the first user.

20. The system of claim 19, wherein the instant message having an audio recording includes a descriptive caption provided by the second user, the second communications client further configured to generate the descriptive caption.

21. The system of claim 19, the second communications client further configured to:
receive a request from the second user to send an instant message to the first user; and
detect that the first user is not present to receive the instant message before checking for the authorization to send the instant message having an audio recording.

22. The system of claim 21, further comprising:
a first communications client of the first user configured to:
authorize the sending of the instant message having an audio recording to the first user.

23. The system of claim 22, wherein the first communications client authorizes the sending of an instant message having an audio recording for a particular presence state of the first user, the particular presence state corresponding to the user being logged off an instant messaging communication network.

24. The system of claim 22, the second communications client further configured to check for authorization from the first user to send the instant message having an audio recording from the second user.

25. The system of claim 24, the second communications client further configured to verify a capability to generate the audio recording.

26. The system of claim 25, the second communications client further configured to present an instant messaging invitation to the second user.

27. The system of claim 26, wherein the instant messaging invitation is a prerecorded message from the first user.

28. The system of claim 26, wherein a particular instant messaging invitation from the first user is presented according to a particular presence state of the first user, the particular presence state corresponding to the first user being logged off an instant messaging communication network.

29. The system of claim 26, the second communications client further configured to initiate the generation of the instant message having an audio recording upon an acceptance of the instant messaging invitation by the second user.

30. The system of claim 21, further comprising:
a communications server configured to:
receive the instant message having an audio recording from the second communications client;
store the instant message having an audio recording until the first user is present; and
deliver the instant message having an audio recording to the first user once the first user is present to receive the instant message having an audio recording.

31. The system of claim 30, the first communications client further configured to:
generate a list of all the stored instant messages having audio recordings for the first user; and
present the list to the first user.

32. The system of claim 31, wherein the list displays an originator of the instant message having an audio recording.

33. The system of claim 32, wherein the list displays the descriptive caption for the instant message having an audio recording.

34. The system of claim 30, the first communications client further configured to display a visual symbol next to a name of a person in a contact list to show that the person sent the instant message having an audio recording.

35. The system of claim 19, further comprising:
a first communications client of the first user configured to:
receive the instant message having an audio recording; and
play the audio recording contained in the instant message having the audio recording.

36. The system of claim 22, further comprising:
a gateway configured to receive the instant message having an audio recording from the second communications client and send the instant message having an audio recording to a designated communications client of the first user.

37. The system of claim 19, wherein the second communications client comprises a PSTN telephone and the audio recording is a voicemail recording, the system further comprising:
a voice messaging system for facilitating the generation of the voicemail recording.

38. The system of claim 37, the voice messaging system configured to:

obtain a directory number of an originator of the audio recording; and provide the first user the directory number associated with the audio recording.

39. The system of claim 38, further comprising:

a first communications client further configured to receive the instant message having an audio recording and display a visual symbol next to a name of a person in a contact list to show that the person is an originator of the audio recording, wherein the directory number associated with the audio recording is compared to directory numbers of persons on the contact list.

* * * * *